Aug. 6, 1968     C. M. T. WESTELAKEN     3,395,898

BULK BLENDER

Filed Jan. 26, 1967     6 Sheets-Sheet 1

United States Patent Office 3,395,898
Patented Aug. 6, 1968

3,395,898
BULK BLENDER
Christianus Marinus Theresia Westelaken, 190 North St., Strathroy, Ontario, Canada
Filed Jan. 26, 1967, Ser. No. 611,995
8 Claims. (Cl. 259—180)

ABSTRACT OF THE DISCLOSURE

An apparatus for blending dry, free flowing materials such as chemical fertilizers having a gravity feed hopper containing a series of sloping transverse and longitudinal baffles to divide and blend the mixtures fed through. Uniform discharge from all parts of the hopper is assured and the blended material falls onto a conveyor belt for transport to a bagging station.

---

This invention relates generally to mixing apparatus and more particularly to blenders of the gravity type designed to mix dry materials.

Whenever dry materials of different kinds are added together, either by weight or volume, and then packaged for sale, considerable handling is required to ensure that the final product is thoroughly blended. Examples of such mixtures as prepared mortar, stock feed, and chemical fertilizers. In some cases as many as eight different materials are combined. Various types of machines have been used to perform the mixing such as tumbling drums and screw troughs but these require valuable floor space and are costly to operate and maintain.

As it is usual to dispense the ingredients for the mixture from gravity supply hoppers, attempts have been made to cause blending of materials by inter-mingling the simultaneous gravity discharges. This has not been found to be fully satisfactory as there is a tendency for each ingredient to segregate itself by grain size, density or other physical factor and to form a layer or strata of its own.

If a plurality of materials is heaped into a common pile, say by shovelling, it will be noted that if large scoops are taken at a time, the resulting blend is not very uniform. It is obvious that the use of a smaller shovel will improve the blending. This is the principle upon which several prior art devices and the present invention rely. An example of a gravity blender of this type is disclosed in U.S. Patent 3,155,377, issued Nov. 3, 1964, but this apparatus has the marked disadvantage that it is extremely tall, requires a high building and hence complicated dispensing hopper loading devices.

It is therefore, an object of this invention to provide an improved gravity mixer.

By one aspect of this invention there is provided a compact gravity mixer comprising a blending unit weigh hopper and a discharge means.

By another aspect of this invention there is provided a gravity mixer comprising a premix weigh hopper, a blending unit and a discharge means.

The invention will be illustrated by way of example by the drawings wherein.

Figure 1:
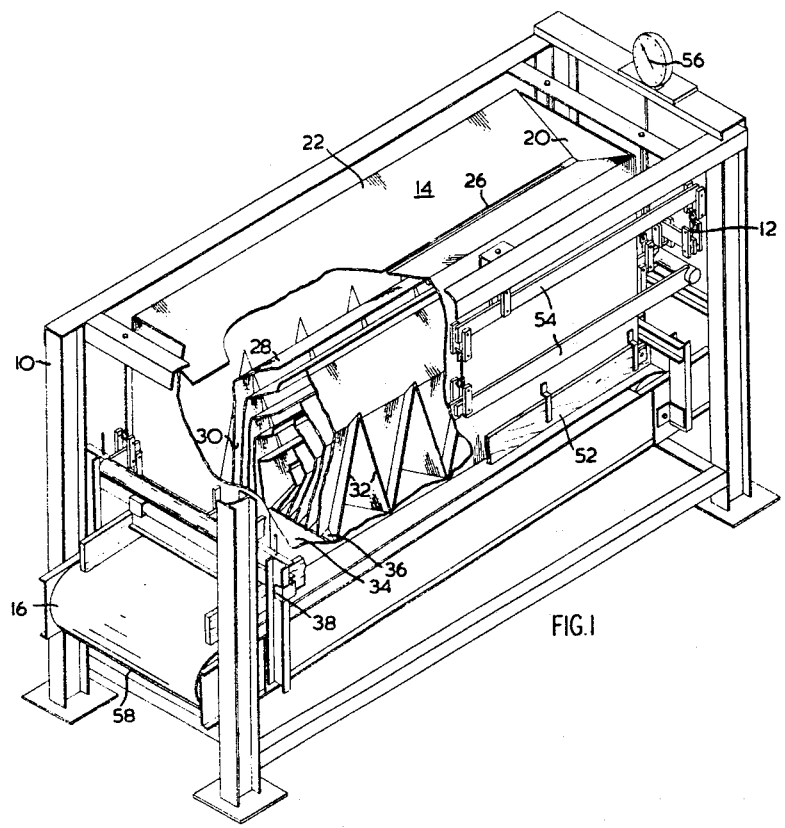
FIGURE 1 is an isometric view, partly cut away of one embodiment of the present invention.
Figure 2:
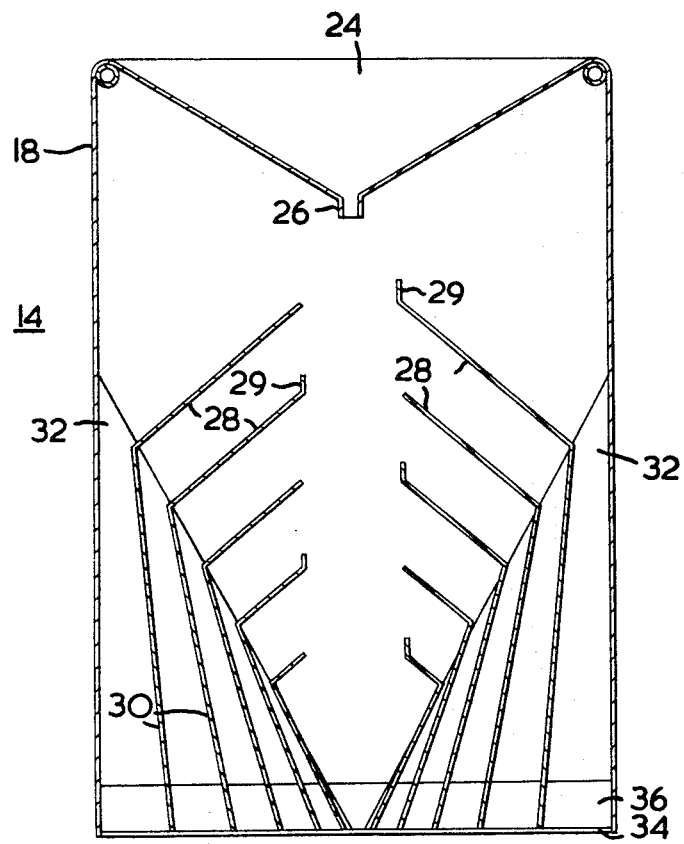
FIGURE 2 is a vertical section of the blending unit of FIGURE 1 showing the arrangement of the intrenal baffles.

In the embodiment of the present invention shown in FIGURES 1 and 2, there is provided a steel frame 10 which normally stands on any suitable floor, special mountings or prepared foundations being unnecessary. Frame 10 supports a weighing system 12 together with its associated blending-weigh hopper 14 and conveyor discharge means 16.

Blending-weigh hopper 14, usually rectangular in shape is fabricated in sheet metal, preferably stainless steel and has vertical side walls 18 and end walls 20. The top 22 is formed from two members sloping downwardly from side walls 18 to form a longitudinal V-shaped receiver 24 extending over the length of the hopper 14 for incoming feed material. Receiver 24 has an inlet slot 26 at the bottom of the V extending over the entire length of the major longitudinal axis of the hopper 14.

Blending hopper 14 is equipped with a plurality of internal baffles. Pairs of primary baffles 28 extend upwardly towards slot 26 from secondary baffles 32 along the entire length of the hopper 14, positioned below and on either side of slot 26. In FIGURES 1 and 2 five pairs of baffles, parallel to each other and spaced apart in vertical relation, are shown, but this number is not critical. It will be noted in FIGURE 2 that on one of each pair of baffles a vertical extension 29 is appended. Vertical extensions 29 are placed alternately on each side in vertical succession.

Ancillary baffles 30 are connected to the outer ends of primary baffles 28 and slope downwardly and inwardly to the bottom of the hopper.

It will be seen from FIGURE 2 that the ancillary baffles 30 are not parallel for reasons to be explained hereinafter.

Triangular secondary baffles 32 are located transverse the primary and ancillary baffles, and are angled to each other so that each triangle is joined to the next in series alternately along the common side at the interior of the hopper and vertical side walls and the apex at the side wall 18 of the hopper, thereby forming a series of blending sections in the hopper. Each section has an outlet aperture 34 of uniform section in the bottom, transverse the primary and ancillary baffles, extending the entire width of the base area defined by the bases of the symmetrically arranged sloping secondary baffles 32. In order that the hopper may be completely self-emptying, small deflector plates 36 are usually installed, preferably at an angle of about 30° to the horizontal, from the uniform outlet apertures 34 to the sloping secondary baffles 32, as more clearly shown in FIGURE 3.

Figure 4:
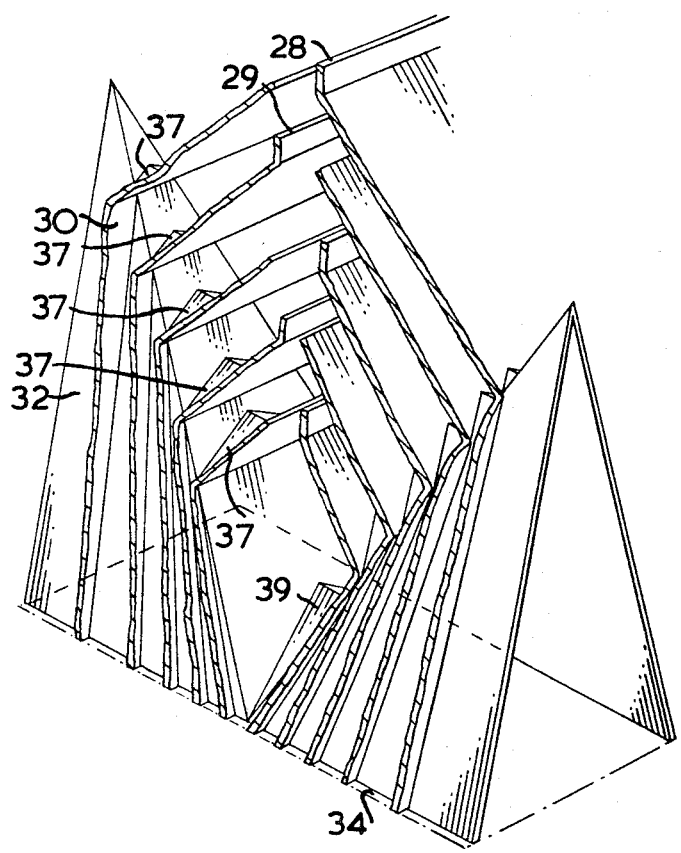
FIGURE 4 is an enlarged view of an alternative embodiment of the internal baffles used in FIGURE 1.

As an alternative embodiment of the internal baffles with the same self-emptying feature, the internal arrangement may be as shown in FIGURE 4. In this embodiment two sloping triangular secondary baffles 32 are located at right angles to the primary and ancillary baffles and a third sloping secondary baffle is located parallel to the primary and ancillary baffles and connected to the first and second secondary baffles along its sloping edges. The bases of the first and second secondary baffles 32 define the edges of the straight outlet aperture 34. In order that the hopper is self-emptying, small deflector plates 37 are placed between each pair of primary baffles 28, instead of the single pair of deflector plates 36 at the base of the hopper as described in the previous embodiment. In the present embodiment, a pair of sloping deflector plates 39 are located at the bottom of the central section of the hopper between the sloping secondary baffles 32 to ensure that this section is also completely emptied.

It will be recognized that no positive shut-off means at the bottom of the hopper is provided, nor is any necessary. Conveyor means 16 is mounted at a predetermined distance from hopper 14, and the combined assembly is freely supported by the weigh means 12. Weigh means 12 is a conventional lever arm balance 54 co-operating with a weigh scale 56. It will be appreciated that the distance between the conveyor 16 and the bottom of the hopper 14 can be adjusted by slide means 38 to accommodate different rates and sizes of feed. It will be further appreciated that conveyor 16 and the bottom of hopper 14 are not parallel. The distance between conveyor 16 and hopper 14 being greater at the discharge end of conveyor 16. The open space between the bottom of hopper 14 and the conveyor is protected by a shield 52. This provision is necessary to ensure an even feed of material from all discharge outlets of the hopper 14 and to prevent scalping of material from the discharges remote from the conveyor discharge 58 by the base of the hopper adjacent the conveyor discharge.

It will be understood that the unit may consist of any number of sections, depending only on the desired capacity and available space.

Figure 3:
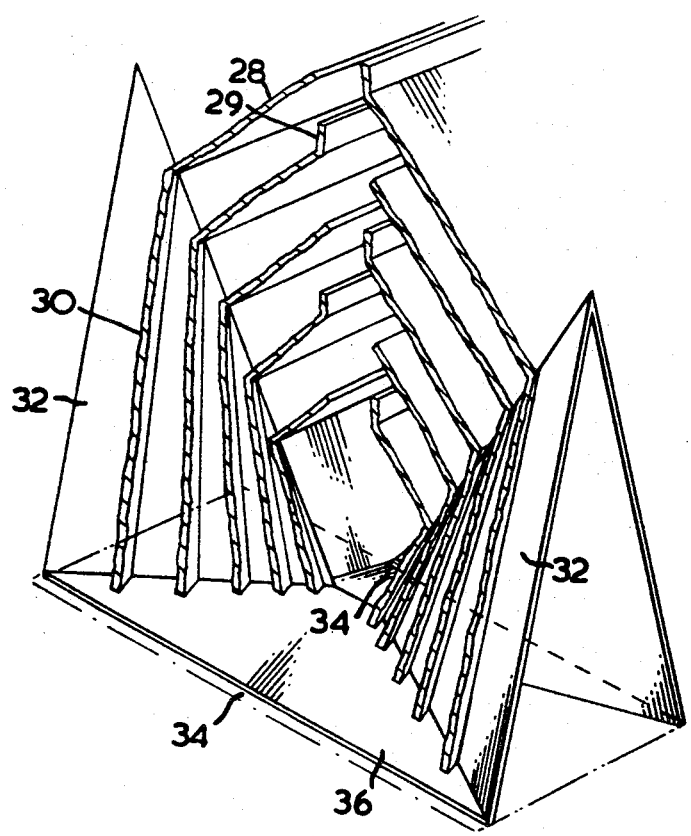
FIGURE 3 is an enlarged view of part of FIGURE 1 showing the internal baffles.

In operation, hopper 14 is filled by means of a fork lift truck, front end loader or similar device, which empties its load into receiver 24. This economical charging method, which obviates the necessity of expensive storage hoppers, fulfils a long felt need from small operators. It will be appreciated, however, that stationary charging means, such as discharge hoppers can be used. The feed material is flood fed through the inlet aperture 26 into the body of the hopper 14. The central section of the blending hopper fills up, some material falling though onto stationary belt 16. Material then overflows into the next section of the hopper, first on one side and then the other, due to the alternate positioning of vertical extensions 29 on primary baffles 28. This alternate overflowing ensures good blending of materials, as it imparts a form of tumbling action on the feed material. When the required weights of all the feed materials to give the desired blend as determined by the weigh mechanism have been loaded into the hopper, the conveyor 16 is started in motion and the materials discharge onto the belt. As the outer deep channel sections of the blender contain more material than the shallow central channel sections, it is necessary for the outlet aperture 34 in these channel sections to be longer than the outlet aperture in the central channel sections. This is achieved by varying the slope of the individual ancillary baffles 30, as shown in FIGS. 2 and 3. The various feed materials are not charged simultaneously so that there is some tendency to layering in the hopper, and in order to ensure a uniform discharge from the belt 16, simultaneous discharge from each channel section of the hopper 14 onto the belt is necessary. By these means the outer channel sections of the hopper finish emptying at the same instant as the central channel sections of the hopper, thus ensuring that the material in cross section of the belt discharge is uniform at all times.

It will be recognized that this embodiment of the invention has many advantages. For example, the unit is low and can therefore be loaded without special charging devices; it is compact and does not require expensive and extensive foundations so that it can easily be moved from site to site. Low cost combined with mobility make the unit particularly suitable for blending chemical fertilizers in remote farming areas where the volume is low and varied and the fertilizer season short. If a particularly cheap operation is required and weighing is unnecessary, then the weigh means 12 can be eliminated and the hopper 14 and conveyor 16, rigidly mounted on the frame 10.

Figure 5:
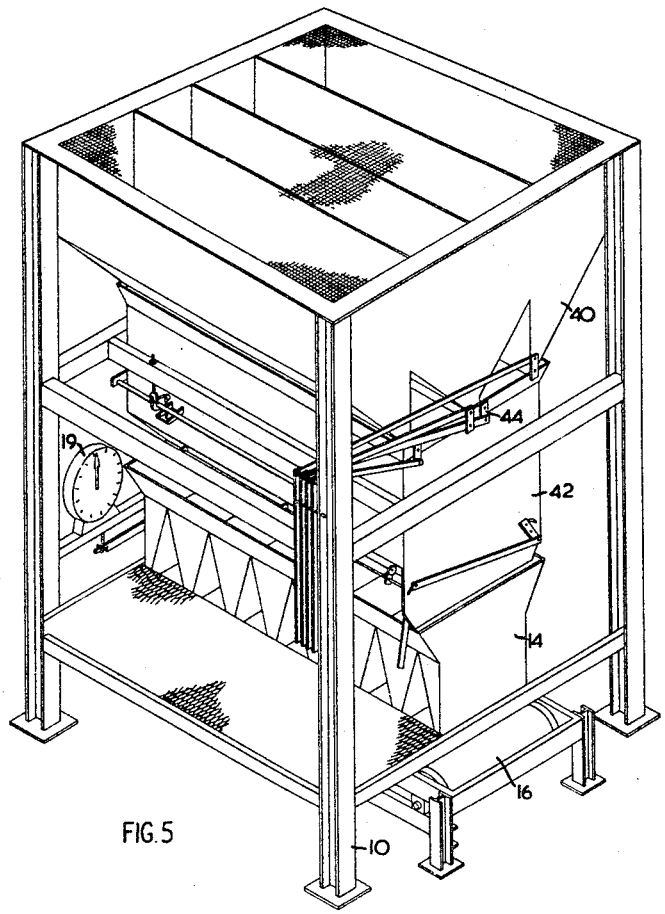
FIGURE 5 is an isometric view of a large embodiment of the present invention.
Figure 6:
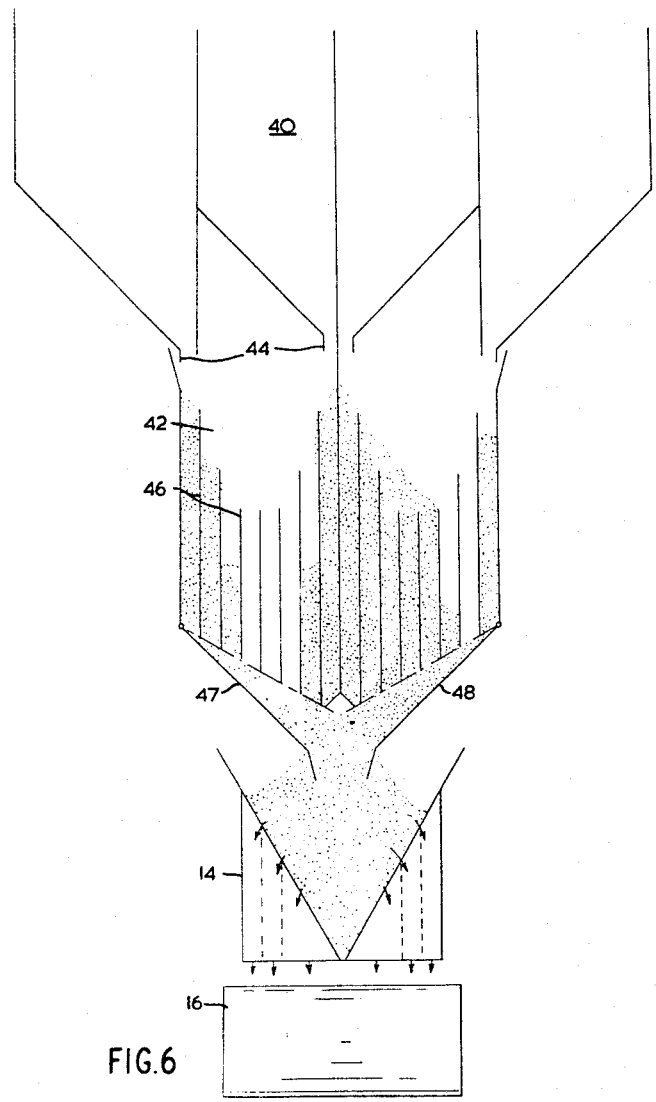
FIGURE 6 is a schematic vertical cross-section of the embodiment of FIGURE 5, showing the blending action of the premix hopper.

If large volumes of material are to be blended, and a fixed location is available, the blending hopper may be incorporated into the larger embodiment of the invention shown in FIGURES 5 and 6.

Frame 10, usually of massive construction, supports a series of storage hoppers 40 vertically above a premix-weigh hopper 42 which is mounted on a weigh means supported on frame 10. The hopper 14 in this embodiment is rigidly mounted on frame 10 as is conveyor means 16. Storage hoppers 40 are provided with gate valves 44 to dispense any desired quantity of feed into premix hopper 42. Premix hopper 42 is provided with a series of vertical baffles 46 of varying height such that the longest baffles are adjacent the gate valves 44. The bottom of hopper 42 is closed by gates 47 and 48 hinged at lower ends 49 and 50 of the side walls of hopper 42. When the desired weight of feed materials have been weighed into hopper 42, gates 47 and 48 are opened and conveyor 16 is started. The material floods down, with considerable blending into blending hopper 14. It will be appreciated that in this embodiment the top 22 of the hopper 14 and inlet aperture 26 are eliminated and the primary baffles 28 are either shortened or entirely eliminated. Material flows through blending hopper 14 as hereinbefore described and conveyed to the packing point by conveyor means 16.

As can be readily seen, the embodiment described in FIGURES 5 and 6 is not a portable piece of equipment and requires substantial foundations. However, in certain circumstances it is preferred as there are more baffles and hence somewhat more blending. By careful selection of materials in the storage hoppers, an almost infinite variety of blends can be readily made without complicated changeover and cleanout procedures and large quantities of material can be handled with minimum inter-stage handling. The dump method necessary in the portable equipment is not convenient when large quantities of material are being handled and gravity feeds from storage hoppers are preferred. Further advantages of the gravity blenders of this invention, as defined by the appended claims, will be readily apparent to those skilled in the art.

I claim:

1. Apparatus for blending dry materials comprising a hopper having side walls and a bottom adapted to receive bulk materials; said hopper having at least one lower outlet aperture and a mutually transverse upper inlet aperture, and having a plurality of primary, secondary and ancillary baffles; said primary baffles sloping upwardly and inwardly towards said inlet aperture, said ancillary baffles sloping upwardly and outwardly from said bottom and said secondary baffles being angularly positioned with respect to said primary and ancillary baffles and dividing at least said ancillary baffles to form channel sections in said hopper; and means to receive and convey said blended materials from said outlet aperture.

2. Apparatus as claimed in claim 1 wherein said hopper and said conveyor means are suspended from a weighing means.

3. Apparatus as claimed in claim 1 wherein said hopper and said conveyor means are mounted at diverging angles to each other.

4. Apparatus as claimed in claim 3 wherein said hopper and said conveyor are suspended from a weighing means.

5. Apparatus as claimed in claim 1 which is self-emptying by the inclusion of angularly mounted deflector plates on each side of said lower outlet aperture.

6. A gravity blending apparatus for blending dry materials comprising: at least one feed hopper mounted above a premix-weigh hopper, a blending hopper mounted beneath said weigh hopper and a conveyor means to convey material discharged from the bottom of said blending hopper; said premix-weigh hopper having a series of vertical internal baffles of decreasing height, the highest baffles being closest to the point of entry of feed material, the bottom of said premix-weigh hopper being adapted to open to discharge material; said blending hopper having at least one lower outlet aperture, and having a plurality of primary, secondary and ancillary baffles, said primary and ancillary baffles having a common orientation transverse said outlet aperture and being disposed adjacent the top and said outlet apertures respectively, said secondary baffles being angularly positioned with respect to said primary and ancillary baffles and dividing at least said ancillary baffles to form channel sections in said hopper.

7. Apparatus for blending dry materials comprising: a hopper having side walls and a bottom adapted to receive bulk materials, said hopper having at least one lower outlet aperture and a mutually transverse upper inlet aperture, and having a plurality of primary, secondary and ancillary baffles; said primary and ancillary baffles having a common orientation parallel to said inlet aperture and being disposed adjacent said inlet and outlet apertures respectively; said secondary baffles being angularly positioned in groups of three with respect to said primary and ancillary baffles, two of each group of said secondary baffles being transverse of the common orientation of said primary and ancillary baffles and the third baffle of each group of said secondary baffles being parallel said common orientation, said secondary baffles dividing at least said ancillary baffles to form channel sections in said hopper.

8. Apparatus as claimed in claim 7 including a pair of angularly mounted deflector plates between said third secondary baffle and each of said primary baffles, and a pair of angularly mounted deflector plates between the central pair of said ancillary baffles.

References Cited
UNITED STATES PATENTS

| | | | |
|---|---|---|---|
| 3,051,453 | 8/1962 | Sluijters | 259—4 |
| 3,259,375 | 7/1966 | Sackett | 259—180 |
| 3,275,304 | 9/1966 | Brundrett | 259—180 |

ROBERT W. JENKINS, *Primary Examiner.*